(12) United States Patent
Borzilleri et al.

(10) Patent No.: US 11,017,405 B2
(45) Date of Patent: May 25, 2021

(54) BLOCKCHAIN COMPLIANCE PLATFORM AND SYSTEM FOR REGULATED TRANSACTIONS

(71) Applicant: GoPublic, Inc., Murray, UT (US)

(72) Inventors: James Borzilleri, Sandy, UT (US); Carlos Garcia Perez, Murray, UT (US); David Nelson, Riverton, UT (US)

(*) Notice: Subject to any disclaimer, the term of this patent is extended or adjusted under 35 U.S.C. 154(b) by 70 days.

(21) Appl. No.: 16/237,588

(22) Filed: Dec. 31, 2018

(65) Prior Publication Data
US 2019/0205881 A1 Jul. 4, 2019

Related U.S. Application Data

(60) Provisional application No. 62/612,144, filed on Dec. 29, 2017.

(51) Int. Cl.
| | |
|---|---|
| *G06Q 20/40* | (2012.01) |
| *G06Q 20/38* | (2012.01) |
| *G06Q 40/04* | (2012.01) |
| *G06Q 30/00* | (2012.01) |
| *G06Q 20/36* | (2012.01) |

(52) U.S. Cl.
CPC ........... *G06Q 20/405* (2013.01); *G06Q 20/36* (2013.01); *G06Q 20/389* (2013.01); *G06Q 20/40145* (2013.01); *G06Q 30/018* (2013.01); *G06Q 40/04* (2013.01)

(58) Field of Classification Search
USPC .................................................... 705/35, 37
See application file for complete search history.

(56) References Cited

U.S. PATENT DOCUMENTS

| | | | | |
|---|---|---|---|---|
| 2005/0097060 A1* | 5/2005 | Lee | ....................... | G06Q 20/045 705/65 |
| 2008/0243713 A1* | 10/2008 | Chiulli | .................. | G06Q 40/06 705/36 R |
| 2009/0070239 A1* | 3/2009 | Kerbawy | ............... | G06Q 40/00 705/30 |
| 2011/0196787 A1* | 8/2011 | Alroy | ................... | G06Q 20/065 705/41 |
| 2013/0204785 A1* | 8/2013 | Monk | .................. | G06Q 20/322 705/44 |
| 2015/0059003 A1* | 2/2015 | Bouse | ................... | H04L 63/102 726/28 |
| 2015/0120472 A1* | 4/2015 | Aabye | .................... | G06Q 20/40 705/16 |

(Continued)

*Primary Examiner* — William E Rankins
(74) *Attorney, Agent, or Firm* — The Concept Law Group, PA; Scott D. Smiley; Scott M. Garrett (57) ABSTRACT

Regulated crypto-assets, or blockchain tokens, that are regulated as securities (security tokens) can be purchased using a compliance platform through a compliance wallet that allows token purchasers and token sellers to purchase and sell security tokens in a regulatory compliant manner. A rules engine of the compliance platform determines what compliance rules need to be satisfied for a given transaction and guides the token purchasers through a compliance process. Token sellers, upon being presented with a request to purchase tokens on the blockchain, can verify approved transactions on the compliance platform to ensure that the transaction can be compliantly processed.

20 Claims, 4 Drawing Sheets

(56) References Cited

U.S. PATENT DOCUMENTS

| | | | |
|---|---|---|---|
| 2016/0125398 A1* | 5/2016 | Sebag | G06Q 20/36 |
| | | | 705/26.43 |
| 2016/0300222 A1* | 10/2016 | Yang | G06Q 20/065 |
| 2019/0028276 A1* | 1/2019 | Pierce | G06Q 20/06 |
| 2019/0057379 A1* | 2/2019 | Chalakudi | G06Q 20/38215 |
| 2019/0080407 A1* | 3/2019 | Molinari | G06Q 20/223 |
| 2019/0164151 A1* | 5/2019 | Doney | G06Q 20/3821 |
| 2019/0340689 A1* | 11/2019 | Gordon, III | G06Q 20/0658 |

* cited by examiner

FIG. 1
Token Sales Workflow

FIG. 4
Rules Engine

BLOCKCHAIN COMPLIANCE PLATFORM AND SYSTEM FOR REGULATED TRANSACTIONS

RELATED APPLICATIONS

This application entirely incorporates by reference the following patent application: U.S. Provisional Pat. App. Ser. No. 62/612,144 filed 29 Dec. 2017.

FIELD OF THE DISCLOSURE

The present disclosure relates generally to electronic transactions for forms of securities and security ownership that are transacted in a distributed ledger blockchain system, also referred to as security tokens, and, more particularly, it relates to a compliance platform system, including a compliance wallet, rules engine, API, blockchain oracle, and other methods that facilitate security token transactions in a blockchain system such that they can be verified as complying with applicable securities regulations.

BACKGROUND

Blockchain technology has gained considerable attention in the last few years, primarily as the technology behind cryptocurrencies like Bitcoin. Bitcoin is one example of a blockchain that can be used for transactions that are tracked and verified on a blockchain ledger. Transactions are grouped into blocks, which are verified by others in a decentralized network in a way that can be further verified by anyone on the network. As long as certain conditions are met, the transactions in a blockchain network ledger can be trusted, and problems like double spending and transaction spoofing are prevented. Blockchain technology can be used for a wide variety of applications where ownership, transfer, and control of assets needs to be tracked. Furthermore, in addition to simply tracking asset ownership, it was found that conditions could be built into transaction events that determine the outcome of the transaction events. That is, the satisfaction, or failure to satisfy, a stated condition would determine what happens to the asset associated with the transaction event.

Given the popularity of blockchain technology, it was quickly realized that one application of blockchain technology is for raising capital. Any asset that can be traded or transacted can be represented as a token in a blockchain network. A token can represent a portion or unit of something of value. A non-blockchain analog of a security token is a share of corporate stock, unit of debt, percentage of revenue share, or any other instrument that may be considered a security. To raise capital, an organization can sell tokens in exchange for capital where the tokens essentially represent an ownership stake in the organization, a revenue share percentage, unit of debt, and so on.

When tokens are sold in exchange for capital it is known as a token offering, or initial coin offering (ICO), named in popular culture because the process resembles the initial public offering (IPO) process. Token offerings have been used as a form of "crowdfunding" to allow organizations to raise capital by selling their own tokens that token purchasers can purchase and trade. However, some of these forms of fundraising are being viewed by governmental agencies as an offering of securities or commodities, and as a result, ICOs and similar token offerings, seeking to avoid violating any applicable laws and regulations, have blocked token purchases from countries and jurisdictions where governmental agencies have issued opinions or statements indicating that such transactions may fall within the purview of securities regulations. In order to protect token purchasers, and to comply with regulations, avoid fraud, and prevent unauthorized parties from purchasing security tokens, both token sellers and token purchasers must meet certain criteria under applicable regulations. For example, in the United States, equity crowdfunding falls under the JOBS Act of 2012. Under that law, there are defined types of securities offerings, which currently include Regulation D, Regulation S, Regulation A+, and Regulation CF (Title III 4(a)6), each with different requirements and limits, for both purchasers and sellers. Under these regulations, and other around the world, token purchasers may be required to verify, including, but not limited to, their identity under applicable "know your customer" (KYC) requirements, their status as an accredited investor, their net income and/or net worth, and anything else required by regulations. Security token purchasers may also need to be screened against various bad actor databases (e.g. AML, OFAC, FINCEN, etc.), and electronically sign (purchase, shareholder, or other) agreements. Ensuring and managing compliance with regulations in a blockchain system can be difficult, especially considering that the regulations for purchasers and sellers are governed by multiple jurisdictional authorities, funds can be sent from anonymous blockchain wallet addresses, there are no methods for tracking or limiting investment limits, and transactions are consumed via public data networks (i.e. the Internet).

Therefore, a need exists to overcome the problems discussed above so that security tokens can be sold in compliance with all governmental regulations.

BRIEF SUMMARY

In an embodiment, a system for the buying and selling of blockchain tokens that are regulated by securities laws in a compliance platform is disclosed. The system comprises a compliance platform authorizing a unique blockchain wallet address that is associated with a token purchaser. The system may comprise a compliance rules engine operated by the compliance platform and configured to determine satisfaction of compliance rules for a security token purchase. The system may further comprise a compliance database in which compliance status of a token purchaser is maintained and made accessible to a token seller.

In an embodiment, the system for buying and selling tokens may further comprise an Application Programming Interface (API) of the compliance platform database to respond to a request from a token seller to verify the satisfaction of compliance rules of a token purchaser.

In an embodiment, the system for buying and selling tokens may further comprise of an Application Programming Interface (API) and exposed via a blockchain oracle of the compliance platform database to respond to a request from a token seller to verify the satisfaction of compliance rules of a token purchaser.

In an embodiment, the system for buying and selling blockchain tokens may further comprise the compliance platform generating and signing a compliance token associated with the token purchaser to indicate satisfaction of compliance rules, and including it in a purchase transaction.

In an embodiment, the system for buying and selling blockchain tokens may further comprise of the generation of an encrypted message by the compliance platform indicating satisfaction of compliance rules and including it in a purchase transaction.

In an embodiment of the disclosure, a method for buying and selling security tokens in a compliance platform is described. The method may comprise establishing a blockchain wallet address for a token purchaser, wherein the wallet address is managed within the compliance platform and has an address in a blockchain ledger. The method may then comprise processing information of the token purchaser against compliance rules within the compliance platform to determine whether the token purchaser is qualified to engage in a given transaction. Upon verification by the compliance platform that the token purchaser is qualified, the method may comprise sending funds to a token seller from the address of the compliance wallet in a request for security tokens from the token seller. The token seller may then verify compliance of the token purchaser; and the token seller may transfer the purchased tokens to the token purchaser's wallet upon validating the transaction.

In a further embodiment of the disclosure, a compliance platform for facilitating transactions of security tokens in a blockchain network is described. The compliance platform may comprise a compliance rules engine coupled to a compliance rules database containing compliance rules for a plurality of jurisdictions, wherein the compliance rules engine is accessed by a token purchaser through a compliance wallet to provide information as prompted by the rules engine through the compliance wallet. Further, the rules engine determines compliance of the token purchaser for a specified token purchase. The compliance platform may comprise an approval database accessible by a token seller to verify compliance of a token purchaser in response to receiving a request to purchase security tokens from the token seller, wherein the approval database contains a record of compliance satisfaction for each token purchaser who completes a compliance process through the rules engine; and wherein the token seller will not sell the security tokens in response to a request to purchase security tokens where the party associated with the request is not approved as compliant for the purchase unless approved in the compliance platform database.

BRIEF DESCRIPTION OF THE DRAWINGS

The accompanying figures together with the detailed description below are incorporated in and form part of the specification and serve to further illustrate various embodiments and explain various principles and advantages all in accordance with the present disclosure.

DETAILED DESCRIPTION

While the specification concludes with claims defining the features of the disclosure that are regarded as novel, it is believed that the disclosure will be better understood from a consideration of the following description in conjunction with the drawing figures. It is to be understood that the disclosed embodiments are merely exemplary of the disclosure, which can be embodied in various forms.

The disclosure describes a blockchain compliance platform, including a compliant blockchain wallet, for regulated security token transactions that overcomes the disadvantages of the known systems and methods of this general type and that ensures compliance with applicable regulations, in multiple jurisdictions, at both the token purchaser and token seller sides of the transactions. In general, the platform facilitates and enforces regulatory compliant trading in crypto assets such as security tokens, as occurs with token sales and ICOs, and which can further facilitate the purchase and sale of non-security tokens. Security token purchasers can be vetted through a compliance approval process, including, but not limited to, a "know your customer" (KYC) process, bad act actor screening, investor accreditation certification, and regulation based compliance forms such as net income or net worth calculations, etc., and receive approval upon satisfying the applicable compliance rules for the token purchasers and token sellers specific jurisdiction and applicable regulations. The compliance process is completed through a compliance platform within the token purchaser's compliance wallet so that the token purchaser's blockchain wallet address is associated with satisfying the required compliance rules, including the amount the token purchaser is approved to invest in a particular transaction. Furthermore, any required documents are signed within the purchaser's blockchain wallet to ensure that the person signing the documents is the owner of the compliance wallet.

When a token purchaser attempts to purchase security tokens, the token seller must verify each token purchaser's approval status with the compliance platform, which interacts with the rules engine of the compliance platform to verify compliance approval based on information provided by the token purchaser. If the token purchaser has passed all the applicable compliance requirements, the compliance platform approves the token purchaser's compliance wallet address in a database accessible by the token seller. The token seller, upon receiving a purchase request, can verify the compliance platform's approval of each token purchaser in the compliance platform's database via an API, blockchain oracle, compliance token, or encrypted message, and then accept the payment and transfer the purchased tokens to the token purchaser's blockchain wallet. If the applicable regulations require a "lock-up" period before the security tokens can be sold or exchanged by the initial token purchaser, the compliance platform will, along with the token seller's restrictions, require tokens be held for any applicable lock-up period by disabling the functionality to sell or transfer the tokens in the compliance wallet for that particular token. Once any applicable lock-up period is over, the functionality will be enabled.

Other features that are considered as characteristic for the disclosure are set forth in the appended claims. As required, detailed embodiments of the present disclosure are disclosed herein; however, it is to be understood that the disclosed embodiments are merely exemplary. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of the disclosure. While the specification concludes with claims defining the features of the disclosure that are regarded as novel, it is believed that the disclosure will be better understood from a consideration of the following description in conjunction with the drawing figures, in which like reference numerals are carried forward. The figures of the drawings are not drawn to scale.

Before embodiments of the present disclosure are described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present disclosure, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present disclosure according to the specific circumstances.

Embodiments of the present disclosure provide a novel and efficient compliance platform and compliance wallet for security token transactions in a blockchain environment where regulatory compliance is necessary. Embodiments of the disclosure provide a blockchain wallet that has compliance forms that are produced and completed as a result of the wallet owner meeting the requirements of (or satisfactorily passing) the applicable regulations for a specific security token purchase. A token purchaser's compliance status can be maintained in a database operated by the compliance platform. An application programming interface (API) is provided so that security token sellers have the ability to verify that the owner of a compliance wallet address is approved for a given security token purchase. Compliance wallets operated according to the compliance platform can be used to buy security tokens with the approval of the compliance platform. The compliance wallet differs from a conventional blockchain wallet in that it cannot be used outside of the compliance platform for security token purchases. The owner of a compliance wallet will have access to the compliance wallet via credentials (e.g. user name, password, passphrase) via the compliance platform. Some embodiments of the disclosure enforce a lock-up period to ensure that security tokens bought are held for a required time period, as may be applicable. This can be enforced by limiting the ability to sell or trade the security tokens in the compliance wallet, and be further enforced by a multi-signature blockchain wallet controlled by the compliance platform, where any sale or transfer of the security tokens would also require the approval of the compliance platform, therefore not allowing the token purchaser to transfer or sell the security tokens until the elapsed holding period is over. These restrictions must also be enforced by the token seller in the terms of their smart contract, software code, or other method, and can be verified by the compliance platform. In some embodiments, such as in cases where the blockchain network does not support smart contracts or holding periods, the compliance platform can maintain records of purchases and enforce holding periods with a multi signature wallet by not signing off on attempted sales or transfers by the token purchaser until the lock-up period has lapsed.

Figure 1:
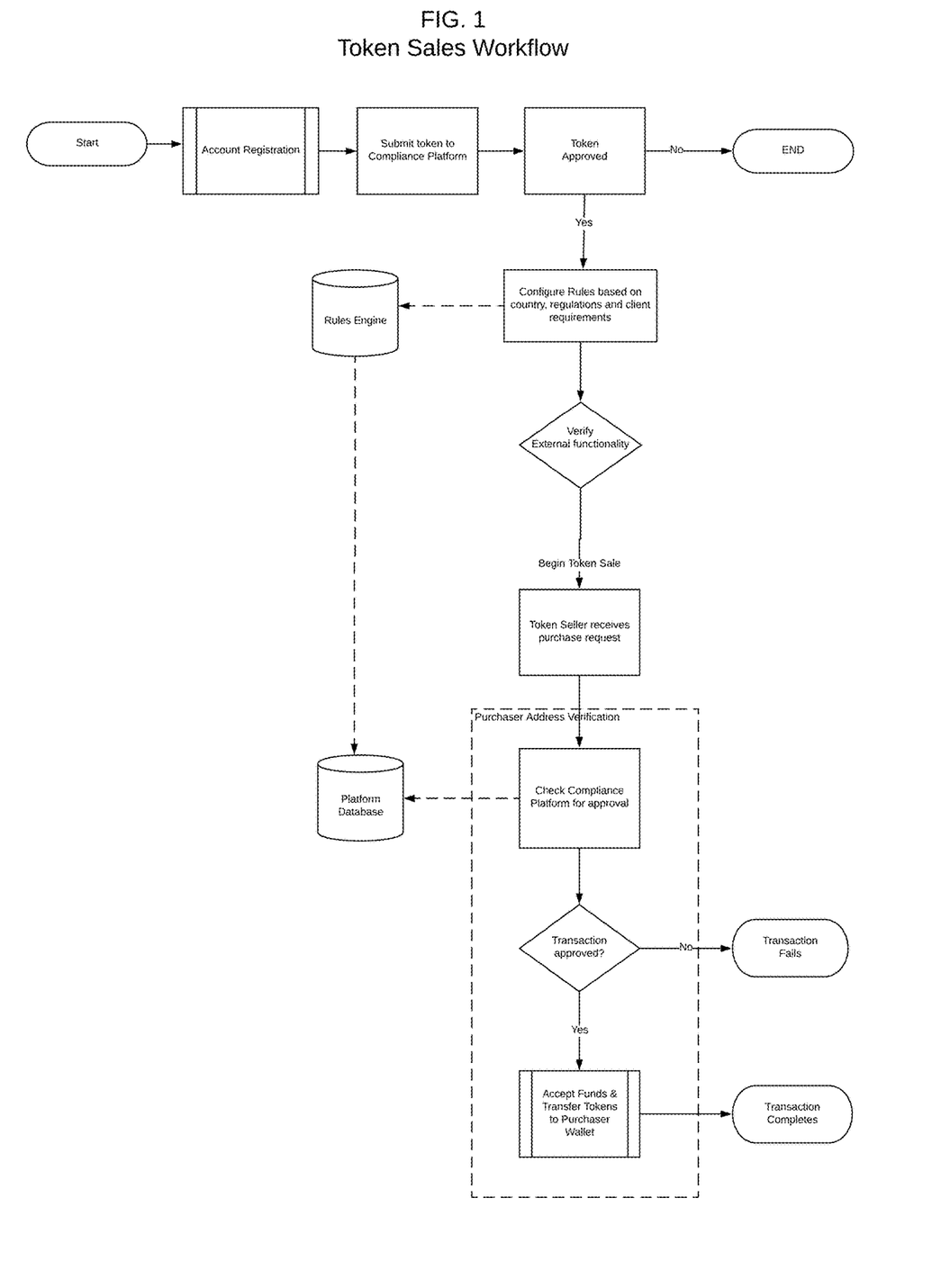
FIG. 1 is a flow chart diagram of a method of submitting tokens for sale and conducting security token sales on a compliance platform, in accordance with some embodiments.

FIG. 1 is a flow chart diagram of a method of submitting and conducting security token sales on a compliance platform, in accordance with some embodiments. At the start a token seller commences an initial process with the compliance platform that includes an account registration process, and a token submission process where the token seller provides information about the security token it intends to sell. The information provided by the token seller can be used to apply compliance rules to token purchasers later. For example, the information can include, but is not limited to, the token seller's legal jurisdiction, the total amount of tokens being sold, the minimum and maximum amount of funds being raised, the start and end dates, the minimum raise amount, if applicable, the documents required, payment information, and any other information that necessitates a compliance element for token purchasers. If the token seller is approved by the compliance platform, then rules are configured by the compliance platform based on the country and jurisdiction, offering type, applicable regulations, and any token seller requirements. The rules can be provided to a rules engine to be used later in approving a token purchaser to purchase the tokens. The compliance platform also verifies external functionality, such as that, for all inbound payments, the token seller enforces a call to the compliance platform's approval database through an API and/or blockchain oracle, or checks for a compliance token, or encrypted message, as applicable, to ensure that the token purchaser is approved for the purchase before transferring any tokens to the token purchaser. Once all the external compliance platform conditions are met by the token seller, a transaction phase occurs where the token seller begins receiving requests to purchase tokens. Each request to purchase tokens on a blockchain originates from a blockchain wallet address from which a token purchaser wants to send funds from, and in return receive the purchased tokens. In response to each request, the token seller commences a blockchain wallet address validation process by accessing the compliance platform to determine whether the token purchaser is approved for that particular token purchase. If the token purchaser is not indicated as being approved by the compliance platform, then the transaction fails. This can occur, for example, when someone on the blockchain, outside of the compliance platform, attempts to purchase security tokens but has not been approved by the compliance process of the compliance platform. If the token seller receives a response or information from the compliance platform that the token purchaser is approved, then the token seller accepts the funds and sends the tokens to the token purchaser. Any applicable lock-up period will be applied (e.g. by the compliance wallet, smart contract, or other software method). The process then ends for the specific transaction, but the transaction phase can be repeated for other purchasers or repeat purchases.

Figure 2:
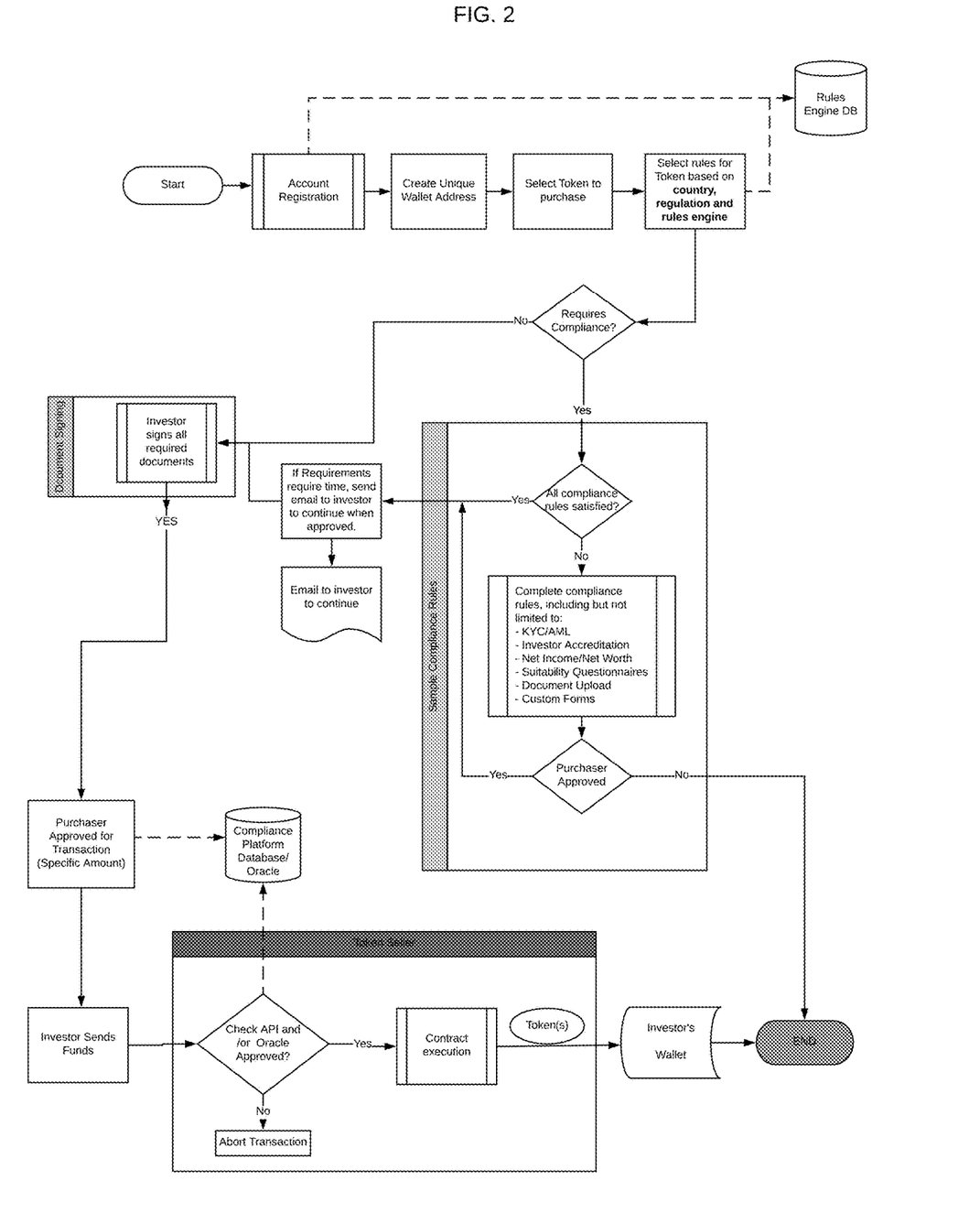
FIG. 2 is a flow chart diagram of a method of conducting security token purchases on a compliance platform using a compliance wallet and API, in accordance with some embodiments.

FIG. 2 is a flow chart diagram of a method for conducting security token purchases on a compliance platform using a compliance wallet, in accordance with some embodiments. To commence the method, a token purchaser (individual or organization) starts by registering for an account with the compliance platform, and then choosing a secret passphrase for their own unique wallet address on a blockchain network. The registration process can include country verification to ensure that the token purchaser in not from a country that disallows cryptocurrencies, security tokens or is otherwise not allowed on the compliance platform. Information about the token purchaser is stored in a database operated by the compliance platform. The compliance platform can provide and manage a compliance wallet for each different blockchain network, so that it can be used to engage in transactions on different blockchain networks, such as, for example, Bitcoin, Ethereum, and others. The token purchaser is the only authorized owner of the wallet and is able to access and operate the wallet on the compliance platform using their password and/or passphrase. For example, when a token purchaser logs into the compliance platform, they can be presented with an interface to unlock their wallet to manage existing tokens, or complete compliance requirements for security token purchases. The compliance platform requires a wallet passphrase known only to the token purchaser, so that only a specific token purchaser can access their compliance wallet and may require facial recognition or other biometric input. This allows the compliance platform to ensure that the token purchaser meets the requirements and is able to purchase a specific amount of security tokens, since the data for the compliance process requires unlocking the wallet successfully and sending funds from the same wallet address.

In certain embodiments, unlocking a blockchain wallet successfully may include further compliance and security procedures. These procedures may include any known biometric identifiers. Such identifiers may include human characteristics such as hand/fingerprint inputs, DNA, voice or face recognition, and iris/retina recognition. As applied to unlocking the compliance wallet, additional procedures could involve requirements that a user additionally input any of the biometric data described and required by the compliance platform and token seller jurisdiction, followed by positive verification at the time of unlocking the wallet by fingerprint scanner, digital eye or facial scans or any other biometric identification technique as necessary.

When a token purchaser desires to make a security token purchase, the token purchaser "unlocks" the compliance wallet with their passphrase and requests token(s) to purchase and goes through the compliance process through the unlocked wallet interface according to the compliance rules engine portion of the method. If the token purchaser is a first-time purchaser, the compliance process may be lengthy. If the token purchaser has previously performed a compliance purchase, then some of the prior compliance information may be used. If prior information or verifications have expired, as applicable, they will need to be completed by the token purchaser again. Once all the compliance requirements are verified by the compliance platform, the compliance platform approves the token purchase in the compliance platform database, indicating the security token to be purchased, and the amount for which the token purchaser is approved.

Thereafter, the token purchaser can initiate a purchase of the security token, and the token seller can access the database of the compliance platform to verify the token purchaser's wallet address and amount are approved by the compliance platform before continuing to complete the transaction, as described in FIG. 1. If the compliance platform returns an approval status, then the token seller can transfer the token(s) to the token purchaser's compliance wallet address. However, if the token seller, upon accessing the compliance platform database, finds the compliance platform has not approved the token purchaser, then the transaction fails.

If a token purchaser were to use a non-authorized wallet address to attempt to purchase a security token, then the compliance platform would be unable to indicate to the token seller that the token purchaser is approved for that transaction and the transaction would fail because the token seller, upon receiving a token purchase request, will access the compliance platform database via an API and/or blockchain oracle, compliance token, or encrypted message as further detailed herein, and find that the token purchasers wallet address has not been approved for that transaction by the compliance platform.

Any purchaser who goes through the compliance process via the compliance platform, and satisfies all applicable compliance elements, will be approved in the compliance platform database. Since the address verification process is performed by the token seller (e.g. as in FIGS. 1 and 3) it is separate from the compliance rules engine, which is performed by the compliance platform. Thus, upon receiving a request to purchase tokens, the token seller initially does not know whether the requesting purchaser is approved or not. The flow chart is not meant to imply that a token purchaser who successfully completes the compliance rules engine process could then fail out of the address verification process performed by the token seller. Rather, failing the address approval decision block in the address verification process indicates that the request was from a party who did not go through the compliance rules engine process of the compliance platform.

In some embodiments, as an alternative to tracking token purchaser compliance via a database lookup of the compliance platform, it is contemplated that the compliance status of a token purchaser, as determined by the compliance platform (e.g. the compliance rules engine) can be indicated by the compliance platform generating and signing a compliance token upon the token purchaser satisfying the compliance rules or other requirements necessary for approval of the purchase of a given security token. A compliance token can be associated with the token purchaser's compliance wallet blockchain address to indicate (e.g. be examined by token sellers on the blockchain) that the token purchaser has satisfied the compliance requirements for that particular security token purchase. It is further contemplated that compliance tokens can be subject to a smart contract that conditions their acceptance for a particular security token purchase. That is, when a token purchaser sends funds from their compliance wallet to a token seller to purchase security tokens, they can also send or identify a compliance token that can be used in addition to, or instead of, the token seller accessing the compliance platform's database.

In some embodiments, where escrow services are required, the compliance platform can provide a multi signature wallet for the temporary holding of funds received from token sales that requires the approval of the compliance platform for the release of funds to the token seller. This is useful for ensuring minimum raise amounts are enforced or refunded to token purchasers if the minimum raise amount is not met, without needing to trust the token seller to refund the funds to purchasers.

In some embodiments, as an alternative to tracking purchaser compliance via a database lookup of the compliance platform, it is contemplated that the compliance status of a purchaser, as determined by the compliance platform (e.g. the compliance rules engine) can be indicated by the compliance platform wherein the platform may generate an encrypted message which may be included in blockchain purchase transactions. Such encrypted message may include the validated purchasing blockchain wallet address of a token purchaser having passed KYC and/or other compliance requirements. That is, while the compliance status of the purchaser is validated by the compliance platform, blockchain purchase transactions of the disclosed embodiments do not necessarily require an API or blockchain oracle lookup by a seller to proceed with the transaction.

Figure 3:
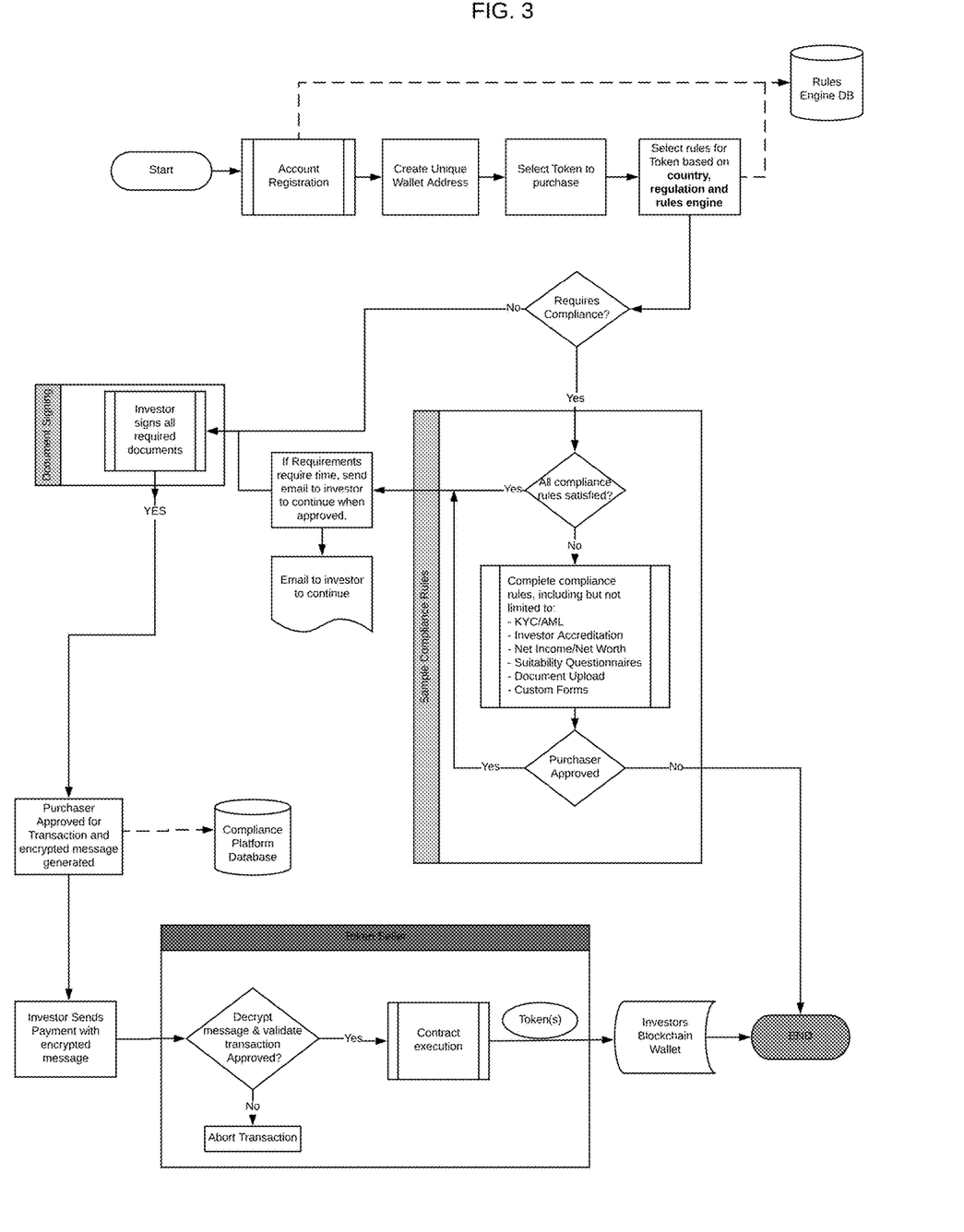
FIG. 3 is a flow chart diagram of a rules engine method for conducting security token purchases on a compliance platform using a compliance wallet and an encrypted message, in accordance with some embodiments.

FIG. 3 is a flow chart diagram of a method for conducting secure purchases in accordance with some embodiments. As previously described in discussion of FIG. 2, a token purchaser begins by going through the compliance process according to the compliance rules engine. Once all of the requirements, including but not limited to "know your customer" (KYC) or other accreditation are verified by the compliance platform, the compliance platform generates an encrypted message. Information included in an encrypted message may be, but is not limited to, the blockchain purchasing address, expiration time and date of the encrypted message, the amount of the approved transaction, a replay nuance (i.e., may the message be re-used in other transactions), and smart contract addresses where applicable. The purchaser may then include the encrypted message in a blockchain payment transaction, for example in a notes field or smart contract, and send funds to a token seller.

The token seller, upon receiving the transaction request, may determine that the transaction contains an encrypted message. If the encrypted message is viewable with the public key that the seller has from the compliance platform, then decryption of the compliance platforms encrypted message by the seller allows verification that the authorized blockchain address contained within the message matches the purchaser's payment address and recipient address for receiving the tokens. If the message is not expired, and meets all other seller conditions, the transaction may then proceed to completion. If, however, any of the conditions are not met, the transaction fails.

A crypto-asset security token compliance platform has been disclosed that allows organizations (token sellers) to raise capital, and individuals and organizations (token purchasers) to provide capital in exchange for tokens, in a manner that ensures compliance with all applicable regulations. The compliance platform provides token purchasers with a unique blockchain wallet address (per blockchain network) that can then be provided to a token seller for the purchase of tokens to ensure that the token purchaser is compliant with applicable regulations and allowed to purchase the requested tokens, and the token seller can verify such status and transfer the tokens to the token purchaser. The compliance platform through which the transactions occur provides the processes to allow the token purchasers to satisfy the compliance elements required to purchase security tokens.

Figure 4:
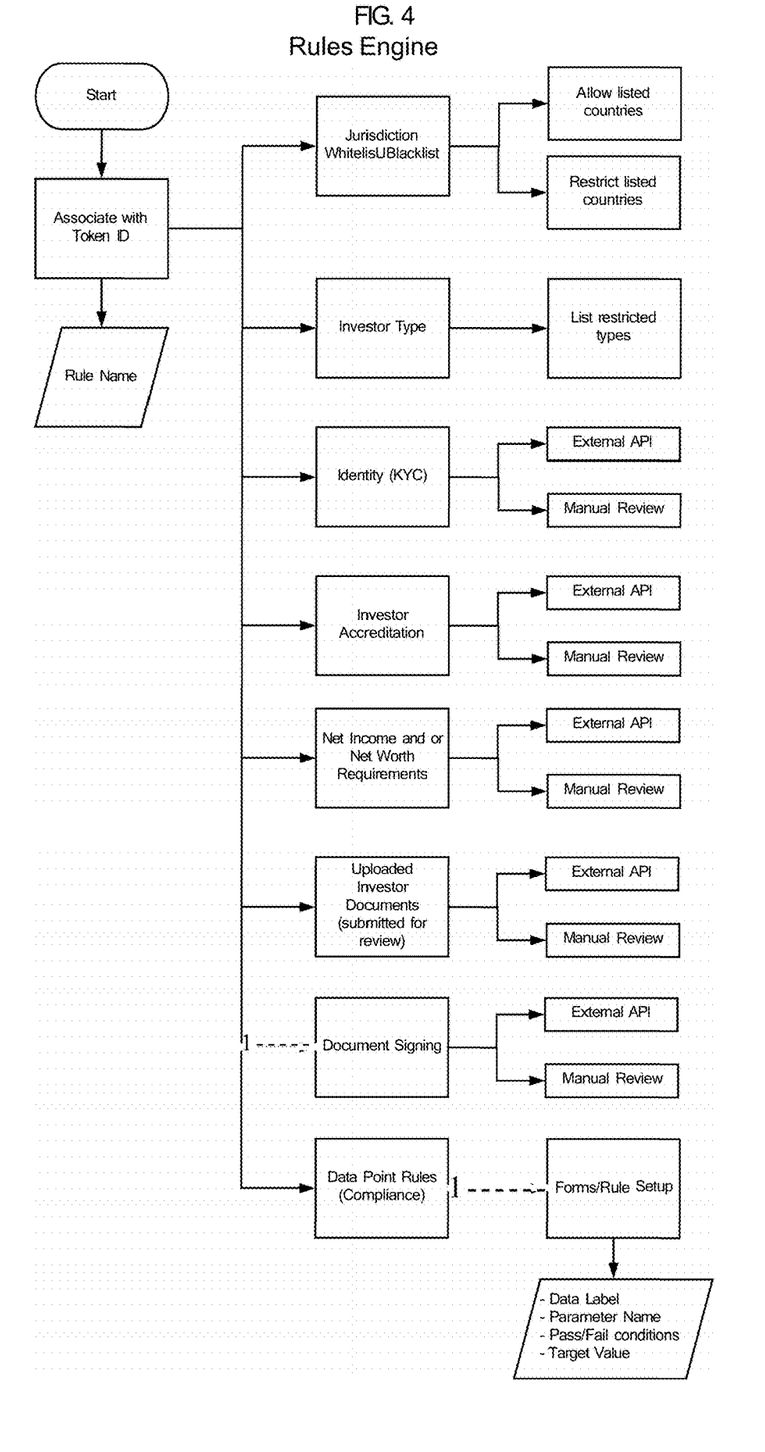
FIG. 4 is a flow chart diagram of a rules engine method for approving a token purchaser for purchasing security tokens on a compliance platform, in accordance with some embodiments.

FIG. 4 is a flow chart diagram of a rules engine method for approving a token purchaser for purchasing security tokens on a compliance platform, in accordance with some embodiments. The process represented here corresponds to part of the compliance rules process of FIG. 2. In a first step there is an association with a security token purchase that can generate a rule name and identification number. Each rule or compliance element relates to evaluating information provided by the token purchaser, which may be subject to verification by the compliance platform or a third party. Among the compliance rules that can be processed, they may include, but are not limited to, a jurisdiction check to identify allowed and/or disallowed jurisdictions, a regulatory rule that describes which, if any, types of token purchasers are prohibited from engaging in the security token purchase, or an identity rule (e.g. "know your customer") that can require external verification, as well as manual review of information provided by the token purchaser. There can further be an amount approval process to determine whether the token purchaser is approved to invest a certain amount, or to determine how much the token purchaser can invest, and still be compliant. The token purchaser can be required to upload copies of relevant documents, which can be reviewed by token sellers, the compliance platform, or by third parties via APIs. There can be a document signing where the token purchaser signs required documents on the compliance platform, or by third parties via APIs. Finally, there is a data point rules set that can indicate compliance, which can be used to generate data input forms and rules matching, the output of which can include a data label, parameter name (e.g. the name of the information being provided), the pass/fail conditions, a target value, or other flags. The compliance process is performed through the compliance wallet, allowing the compliance platform to ensure that the token purchaser's compliance wallet address is associated with each compliance item. By performing compliance through the compliance wallet in this manner, the use case where a token purchaser can provide any wallet address, which may be owned by a different person who does not meet the necessary qualifications to be comply with applicable regulations, is avoided. Ensuring the compliance of the token purchaser actually associated with the wallet address used in the transaction of securities greatly reduces the risk to token sellers that they are engaging in a non-compliant transaction and enforces KYC.

As described, the compliance platform may therefore validate compliance for a user/blockchain address in at least four ways. That is API, API to Oracle for blockchain smart contracts, providing compliance tokens on a private blockchain, and encrypted authorization messages.

Although the disclosure is illustrated and described herein as embodied in a blockchain compliance platform and system for regulated transactions, it is, nevertheless, not intended to be limited to the details shown because various modifications and structural changes may be made therein without departing from the spirit of the disclosure and within the scope and range of equivalents of the claims. Combinations of elements of the embodiments specifically described are also contemplated where applicable. Additionally, well-known elements of exemplary embodiments of the disclosure are not described in detail or are omitted so as not to obscure the relevant details of the disclosure.

What is claimed is:
1. A system for the buying and selling of blockchain security tokens that are regulated by securities laws in a compliance platform, comprising:
    a compliance wallet having a unique wallet blockchain address that is associated with a token purchaser;

a compliance rules engine operated by the compliance platform and configured to determine satisfaction of compliance rules for a security token purchase by the token purchaser; and a compliance database in which compliance status of the token purchaser is maintained and made accessible to a token seller;

wherein upon receiving a request to complete the security token purchase from the security token purchaser the token seller accesses the compliance database to determine whether the security token purchaser is qualified to make the security token purchase, and when the security token purchaser is qualified to make the security token purchase, the token seller transfers an amount of security tokens to the compliance wallet using a blockchain ledger, and when the security token purchaser is not qualified to make the security token purchase, the token seller denies the security token transaction.

2. The system of claim 1, further comprising an Application Programming Interface (API) of the compliance database to respond to a request from a token seller to verify satisfaction of compliance of a token purchaser.

3. The system of claim 1, further comprising an Application Programming Interface (API) that is exposed via a blockchain oracle of the compliance database to respond to a request from a token seller to verify the satisfaction of compliance rules of a token purchaser.

4. The system of claim 1, wherein the compliance platform is configured to generate and sign a compliance token and to associate the compliance token with the token purchaser's blockchain wallet to indicate satisfaction of compliance rules and including it in a purchase transaction.

5. The system of claim 1, further comprising an encrypted message generated by the compliance platform to verify satisfaction of compliance rules and configured to be included in a purchase transaction.

6. The system of claim 1, wherein the compliance rules include compliance rules for validating the jurisdictional location of the token purchaser, the token purchaser's identity, the token purchaser's accreditation status, the token purchaser's income/net worth requirement, and/or other regulatory or government requirements.

7. The system of claim 6, wherein the token purchaser's identity is validated utilizing biometrics techniques.

8. The system of claim 1, wherein the compliance rules are validated in a rules engine of the compliance platform.

9. The system of claim 1, wherein the compliance platform is configured to facilitate purchase of tokens wherein successful compliance must be verified prior to accepting funds from the token purchaser.

10. The system of claim 1, wherein the compliance platform provides a token purchaser interface to operate the token purchaser's compliance wallet.

11. The system of claim 10, wherein the compliance platform further provides a compliance process within the compliance wallet interface.

12. The system of claim 1, wherein the compliance wallet includes a user interface for performing token purchaser compliance and document signing in the compliance wallet.

13. The system of claim 1, wherein the compliance status of the token purchaser includes an amount which the token purchaser is approved to purchase.

14. A method for buying and selling security tokens in a compliance platform, comprising:

establishing a compliance wallet for a token purchaser, wherein the compliance wallet is managed within the compliance platform and has an address in a blockchain ledger that is managed by the compliance platform;

processing information of the token purchaser against compliance rules within the compliance platform to determine whether the token purchaser is qualified to engage in a given transaction and maintaining a compliance status of the token purchaser in a compliance platform database;

sending funds to a token seller, from an authorized blockchain address of the compliance platform, in a request for security tokens from the token seller;

the token seller attempting to verify compliance of the token purchaser by accessing the compliance status of the token purchaser in the compliance platform database; and the token seller providing the tokens to the token purchaser's blockchain wallet address upon successfully verifying the compliance of the token purchaser, and wherein the token seller does not provide the tokens to the token purchaser's blockchain wallet when the token purchaser's compliance status cannot be verified.

15. The method of claim 14, wherein processing information of the token purchaser against the compliance rules comprises processing identity information of the token purchaser against compliance rules that include at least one compliance rule.

16. The method of claim 14, wherein verifying compliance of the token purchaser; comprises the token seller accessing a database API of the compliance platform database that is associated with a database in which the compliance platform maintains records of token purchaser wallet address(es) for a particular token purchase.

17. The method of claim 14, wherein sending the funds to the token seller comprises sending a predetermined and specific amount of funds from the token purchaser's blockchain wallet.

18. The method of claim 14, wherein establishing the blockchain wallet address is performed within the compliance wallet by the token purchaser on the compliance platform.

19. A compliance platform for facilitating transactions of security tokens in a blockchain network, comprising:

a compliance rules engine coupled to a compliance rules database containing compliance rules for a plurality of jurisdictions, wherein the compliance rules engine is accessed by a token purchaser through a compliance wallet having a blockchain address to provide information as prompted by the rules engine through the compliance wallet, and wherein the compliance rules engine is configured to request and receive from the token purchaser information indicated by the compliance rules database and to determine a compliance status of the token purchaser for a specified token purchase;

a compliance platform database that is accessible by a token seller to verify the compliance status of the token purchaser in response to receiving a request to purchase security tokens from the token seller, wherein the compliance platform database contains a record of compliance satisfaction for each token purchaser who completes a compliance process through the rules engine and wherein the compliance platform is configured to determine the compliance status of the token purchaser based on the record of compliance for the token purchaser, and is further configured to provide the compliance status of the token purchaser to the token seller upon receiving a request for the token purchaser's compliance status in response to the token seller receiving the request to purchase security tokens from the token purchaser; and wherein the token seller does not sell the security tokens in response to a request to purchase security tokens where the compliance status of the token purchaser associated with the request is not approved as compliant for the purchase as indicated in the compliance platform database.

20. The compliance platform of claim 18, further comprising a compliance wallet having a blockchain address, and which has compliance and document signing built in to the compliance wallet to allow a token purchaser who owns the compliance wallet to commence a token purchase, complete a compliance process through the compliance wallet, and thereafter be listed as approved for the security token purchase in the compliance platform database, wherein a token seller can verify compliance of the token purchaser in the compliance platform database.

* * * * *